Patented June 23, 1925.

1,542,873

UNITED STATES PATENT OFFICE.

CARL HAGBERG, OF STOCKHOLM, SWEDEN, ASSIGNOR TO AMERICAN GASACCUMULATOR COMPANY, OF ELIZABETH, NEW JERSEY, A CORPORATION OF NEW JERSEY.

POROUS MASS FOR STORING EXPLOSIVE GASES.

No Drawing.  Application filed March 9, 1921. Serial No. 450,960.

*To all whom it may concern:*

Be it known that I, CARL HAGBERG, residing at Stockholm, Sweden, have invented certain new and useful Improvements in Porous Masses for Storing Explosive Gases, of which the following is a specification.

The present invention refers to an improvement in porous masses for storing explosive gases with or without a dissolving means for the gas, as for instance acetylene, of the kind in which the filling mass is incoherent and consists of a granulated or fibrous material, such as granulated charcoal, or fibres of silk, asbestos, kapok or the like. Porous masses consisting of such incoherent materials have been found to be objectionable and unsatisfactory because in the transportation of receivers containing the same the wear or rubbing between the grains or fibres has resulted in objectionable and unpermissible spaces between the grains or fibres, whereby the risk of explosion arises, and moreover the receiver is not kept completely filled up by the mass as said mass collapses during transport and use due to agitation incident or due to such transportation and use. Also powder, produced by the attrition of the grains or fibres, is carried with the gas, when being taken out from the receiver for consumption, whereby apparatus connected with the receiver may be damaged, and narrow pipes and openings are obstructed. The said spaces also occasion the dissolving means of the gas being carried with the gas, when flowing out from the receiver, in considerably greater extent than by employing porous masses which are agglomerated or made in form of solid bricks or blocks.

The invention has for its object to obviate these objections and consists of an incoherent granulated or fibrous material mixed with a porous finely divided or powdered substance, such as siliceous earth or the like. Said substance is added in such an amount that it practically fills up the spaces or voids between the granules or fibres, whereby the advantage is gained that the wear between said granules or fibres is considerably diminished when the receiver is subjected to shocks or is shaken, as during transport. The dissolving means for the gas is moreover better retained in the mass and is not carried away by the gas as it flows out of the receiver. The risk of explosion is also diminished.

The finely divided or powdered substance mixed with the granulated or fibrous material preferably may have the property of being fire proof so that it may not be charred or destroyed if the receiver be heated or if a flame of the gas should flash back into the receiver, or if a local explosion of the gas should take place in the receiver.

According to one mode of carrying the invention into practice granulated material, such as charcoal grains, is mixed with such an amount of the porous incombustible substance, such as siliceous earth, that the spaces between the charcoal grains practically will be filled up by the same, that is to say, so that the receiver practically contains as much charcoal as if it were filled with charcoal only. After the filling mass has been poured into the receiver the latter is submitted to a shaking motion in the usual manner until the mass has the porosity required.

The percentage of the porous finely divided or powdered substance to be added to the granulated or fibrous material is dependent on the size of the grains or fibres. In the case of grains of the size of 0.5–1 mm., for example, the weights of the volumes of charcoal and filling material shaken together preferably should be approximately equal.

What I claim as my invention is:

1. A porous mass for storing gas consisting of charcoal grains in an incoherent condition mixed with silicious earth.

2. A porous mass for storing gas consisting of granulated charcoal mixed with a quantity of silicious earth sufficient to fill up the spaces between the granules.

3. A porous mass for storing gas consisting of a mixture of granulated material and a powder of a fire proof substance.

In testimony whereof I have signed my name to this specification.

CARL HAGBERG.

Witnesses:
WALDEMAR BOMAN,
A. BIORCK.